United States Patent
Wan et al.

(10) Patent No.: US 12,326,147 B2
(45) Date of Patent: Jun. 10, 2025

(54) ELECTRIC OIL PUMP

(71) Applicant: ZHEJIANG SANHUA AUTOMOTIVE COMPONENTS CO., LTD., Zhejiang (CN)

(72) Inventors: Lingli Wan, Zhejiang (CN); Lili Liu, Zhejiang (CN); Wei Ye, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 310 days.

(21) Appl. No.: 18/026,587

(22) PCT Filed: Sep. 14, 2021

(86) PCT No.: PCT/CN2021/118179
§ 371 (c)(1),
(2) Date: Mar. 15, 2023

(87) PCT Pub. No.: WO2022/057784
PCT Pub. Date: Mar. 24, 2022

(65) Prior Publication Data
US 2023/0332599 A1    Oct. 19, 2023

(30) Foreign Application Priority Data
Sep. 15, 2020   (CN) .......................... 202010969091.5

(51) Int. Cl.
*F04C 2/10*      (2006.01)
*F04C 11/00*     (2006.01)
(Continued)

(52) U.S. Cl.
CPC ................ *F04C 14/28* (2013.01); *F04C 2/10* (2013.01); *F04C 11/008* (2013.01);
(Continued)

(58) Field of Classification Search
CPC ............ F04C 2240/808; F04C 2240/81; F04C 2270/19; F04C 14/28; F04C 2/10;
(Continued)

(56) References Cited

U.S. PATENT DOCUMENTS 5,006,743 A * 4/1991 King ...................... H02K 11/33
310/89
8,829,839 B1 * 9/2014 Vrankovic ......... H02K 11/0094
388/934

(Continued)

FOREIGN PATENT DOCUMENTS

CN          203761204 U    8/2014
DE     102017210426 A1    12/2018
(Continued)

OTHER PUBLICATIONS

The European search report issued on Sep. 19, 2024 for EP21868607.9.

(Continued)

*Primary Examiner* — Thomas Fink
(74) *Attorney, Agent, or Firm* — Yue (Robert) Xu

(57) ABSTRACT

An electronic oil pump includes a first rotor assembly, a stator assembly, an electric control board assembly, an isolation member and thermal conductive members; the first rotor assembly is located in a first chamber of the electronic oil pump, the thermal conductive members each comprise a first portion and a second portion, the first portions being located in a second chamber of the electronic oil pump, the second portions being located in a third chamber of the electronic oil pump; the electric control board assembly includes a base plate and a temperature-sensing unit, the base plate including first holes, an upper plate layer, a lower plate layer and at least one metal layer, a part of the second portions being located in the first holes; the temperature-sensing unit is located at one side of the second portion, (Continued)

there is a preset distance between the temperature-sensing unit and the second portion.

11 Claims, 9 Drawing Sheets

(51) Int. Cl.
*F04C 14/28* (2006.01)
*H02K 7/14* (2006.01)
*H02K 11/25* (2016.01)

(52) U.S. Cl.
CPC .. *F04C 2210/206* (2013.01); *F04C 2240/808* (2013.01); *F04C 2240/81* (2013.01); *F04C 2270/19* (2013.01); *F04C 2270/195* (2013.01); *H02K 7/14* (2013.01); *H02K 11/25* (2016.01)

(58) Field of Classification Search
CPC ............. F04C 11/008; F04C 2210/206; F04C 2270/195; F04C 2/102; H02K 2203/03; H02K 2211/03; H02K 5/225; H02K 11/25; H02K 7/14; H02K 2213/03; H02K 11/30; F04B 17/03; H01L 23/3735
See application file for complete search history.

(56) References Cited

U.S. PATENT DOCUMENTS

| | | | |
|---|---|---|---|
| 11,545,793 B2 * | 1/2023 | Malandain | G01K 1/16 |
| 11,821,420 B2 * | 11/2023 | Graves | H02K 11/33 |
| 2014/0084834 A1 * | 3/2014 | Saito | G01K 1/16 |
| | | | 318/473 |
| 2014/0265741 A1 | 9/2014 | Vrankovic et al. | |
| 2016/0281718 A1 | 9/2016 | Zhang et al. | |
| 2017/0082104 A1 * | 3/2017 | Yamamoto | F04C 15/0096 |
| 2017/0126104 A1 * | 5/2017 | Yamanaka | H02K 11/25 |
| 2019/0003477 A1 | 1/2019 | Graves | |
| 2020/0381874 A1 * | 12/2020 | Rose | H01R 13/111 |
| 2020/0412069 A1 * | 12/2020 | Malandain | H05K 1/115 |
| 2023/0178910 A1 * | 6/2023 | Kim | H05K 1/144 |
| | | | 361/743 |
| 2023/0217590 A1 * | 7/2023 | Kim | H05K 1/144 |

FOREIGN PATENT DOCUMENTS

| | | | |
|---|---|---|---|
| EP | 1178212 A2 | 2/2002 | |
| EP | 3073119 A1 | 9/2016 | |
| EP | 3654740 A1 * | 5/2020 | |
| JP | H02184061 A | 7/1990 | |
| JP | H09311078 A | 12/1997 | |
| JP | 2000188850 A | 7/2000 | |
| JP | 2007040786 A | 2/2007 | |
| JP | 2012038769 A | 2/2012 | |
| JP | 2014009676 A | 1/2014 | |
| JP | 2014107359 A | 6/2014 | |
| JP | 2020525708 A | 8/2020 | |
| WO | WO-2020213692 A1 * | 10/2020 | .......... F04C 18/0215 |

OTHER PUBLICATIONS

The Japanese 1st Office Action issued on Feb. 6, 2024 for JP2023-516173.

International Search Report for PCT/CN2021/118179 mailed Oct. 29, 2021, ISA/CN.

* cited by examiner

ELECTRIC OIL PUMP

The present application is a National Phase entry of PCT Application No. PCT/CN2021/118179, filed on Sep. 14, 2021, which claims the priority to Chinese Patent Application No. 202010969091.5, titled "ELECTRONIC OIL PUMP", filed with the China National Intellectual Property Administration on Sep. 15, 2020, the entire disclosures of which are incorporated herein by reference.

FIELD

The present application relates to the technical field of vehicles, and in particular to an assembly of a lubrication system and/or a cooling system of a vehicle.

BACKGROUND

A lubrication system and/or cooling system of a vehicle is mainly powered by an electronic oil pump; an operation state of the electronic oil pump is related to oil temperature; in order to detect the oil temperature in the electronic oil pump, a temperature sensor is arranged on an inlet pipeline of the electronic oil pump of the system, so as to detect the oil temperature. The temperature sensor is connected with a control unit of the system through a wiring harness, which makes the temperature sensor have mechanical and electrical connections, resulting in a relatively complex system structure.

SUMMARY

An object of the present application is to provide an electronic oil pump, which is beneficial to simplifying a system structure.

In order to achieve the above object, the following technical solution is provided according to an embodiment of the present application.

An electronic oil pump includes a first rotor assembly, a stator assembly and an electric control board assembly, a pump housing may form a pump cavity, the pump cavity includes a first cavity, a second cavity and a third cavity. The first rotor assembly is located in the first cavity, the stator assembly is arranged in the second cavity, the electric control board assembly is arranged in the third cavity, and the first cavity is communicated with the second cavity, and the second cavity is not communicated with the third cavity; the electronic oil pump further includes a partition member, at least part of the partition member is arranged between the stator assembly and the electric control board assembly, the second cavity is located at one side of a main body of the partition member, the third cavity is located at the other side of the main body of the partition member; the electronic oil pump further includes a heat conducting member, the heat conducting member includes a first part and a second part, the first part is located in the second cavity, the second part is located in the third cavity; the electric control board assembly includes a substrate, the substrate includes a first hole, an upper plate layer, a lower plate layer and at least one metal layer, the metal layer is located between the upper plate layer and the lower plate layer, the upper plate layer is closer to the main body of the partition member than the lower plate layer, the first hole is defined in a direction from an upper surface of the upper plate layer to the lower plate layer, part of the second part is located in the first hole; the electric control board assembly further includes a temperature sensing unit, the temperature sensing unit is connected with the substrate. Along a height direction perpendicular to the electronic oil pump, the temperature sensing unit is located at one side of the second part. There is a preset distance between the temperature sensing unit and the second part; a metal layer closest to the temperature sensing unit is defined as the nearest metal layer, the temperature sensing unit is orthographically projected to a direction parallel to an upper surface of the nearest metal layer, at least a part of the projection of the temperature sensing unit is located on the nearest metal layer, the temperature sensing unit can detect the temperature of the nearest metal layer, or the temperature sensing unit can detect the temperature of the upper plate layer contacting with the nearest metal layer or the temperature of the lower plate layer contacting with the nearest metal layer.

In this way, the temperature sensing unit is integrated with the electronic oil pump, and the temperature sensing unit does not need to be mechanically and electrically connected with the external system separately, so that the mechanical connection and circuit connection of the system can be reduced relatively, and the system structure can be simplified and made relatively compact.

DETAILED DESCRIPTION OF THE EMBODIMENTS

The present application is further illustrated hereinafter in conjunction with drawings and specific embodiments.

The electronic oil pump in the following embodiments mainly provide flowing power for the working medium of the lubrication system and/or cooling system of a vehicle, and specifically provide flowing power for the working medium of the lubrication system and/or cooling system in a transmission system of the vehicle.

Figure 1:
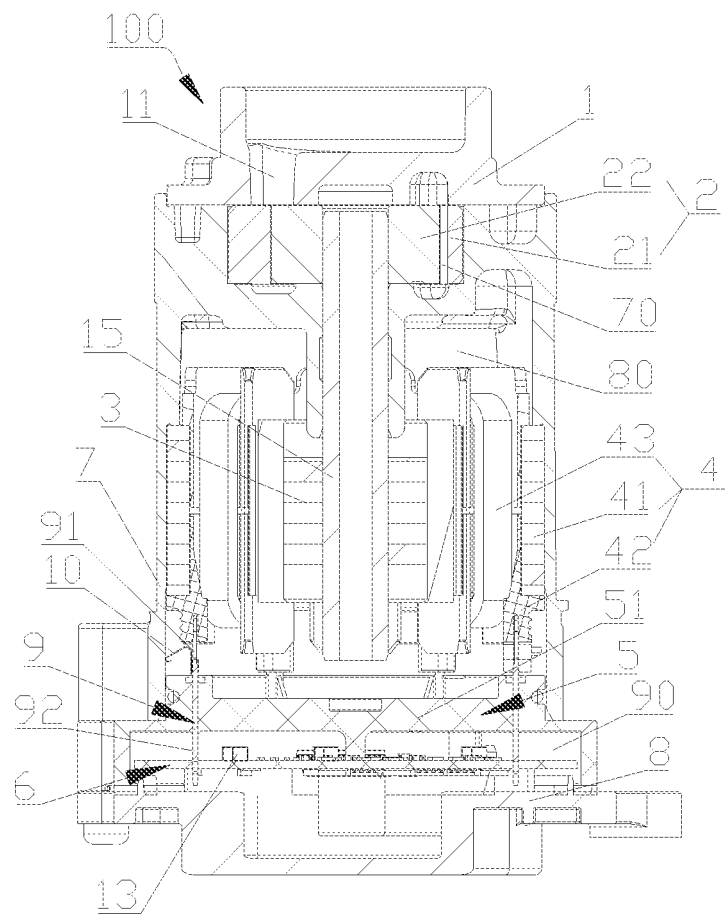
FIG. 1 is a schematic cross-sectional structural view of a first embodiment of an electronic oil pump provided according to the present application.

Referring to FIG. 1, an electronic oil pump 100 includes a pump housing, a first rotor assembly 2, a stator assembly 4, a second rotor assembly 3 and an electric control board assembly 6; the electronic oil pump 100 has a pump cavity, the first rotor assembly 2, the stator assembly 4, the second rotor assembly 3 and the electric control board assembly 6 are arranged in the pump cavity, in this embodiment, the pump cavity includes a first cavity 70, a second cavity 80 and a third cavity 90, and, the first cavity 70, the second cavity 80 and the third cavity 90 are sequentially distributed along the height direction, the first rotor assembly 2 is arranged in the first cavity 70, the stator assembly 4 and the second rotor assembly 3 are arranged in the second cavity 80, the electric control board assembly 6 is arranged in the third cavity 90, and the first cavity 70 is communicated with the second cavity 80, and the second cavity 80 is not communicated with the third cavity 90; the stator assembly 4 includes a stator iron core 41, an insulating frame 42 and a winding 43, the insulating frame 42 covers at least part of a surface of the stator iron core 41, and the winding 43 is wound around the insulating frame 42; when the electronic oil pump 100 operates, the electric control board assembly 6 controls the current in the winding 43 passing through the stator assembly 4 to change according to a predetermined rule, thereby controlling the stator assembly 4 to generate a changing excitation magnetic field, the second rotor assembly 3 rotates under the action of the excitation magnetic field, and the second rotor assembly 3 can directly or indirectly drive the first rotor assembly 2 to rotate; when the first rotor assembly 2 rotates, a volume of the hydraulic chamber between the first rotor and the second rotor of the first rotor assembly 2 changes, so that the working medium is pressed out to the outlet to generate flowing power; in this embodiment, part of the working medium in the first cavity 70 can flow into the second cavity 80, since the stator assembly 4 is arranged in the second cavity 80, the working medium in the second cavity 80 can cool the stator assembly 4, thus facilitating the heat dissipation of the stator assembly 4.

Referring to FIG. 1, in this embodiment, the pump housing includes a pump cover 1, a first housing 7 and a second housing 8, the pump cover 1 is fixedly connected with the first housing 7 and the first housing 7 is fixedly connected with the second housing 8, the pump cover 1, the first housing 7 and the second housing 8 are made of metal, of course, the material of the pump cover 1, the first housing 7 and the second housing 8 can be other materials such as plastic; specifically, in this embodiment, the pump cover 1 is connected with the first housing 7 by screws or bolts, this arrangement makes the disassembly and assembly of the electronic oil pump convenient, thus facilitating the maintenance of the first rotor assembly 2 of the electronic oil pump, of course, the pump cover 1 and the first housing 7 may also be connected by other ways, such as plugging and clamping; the first housing 7 is fixedly connected with the second housing 8, specifically, the first housing 7 and the second housing 8 are connected by screws or bolts, so that the electronic oil pump is convenient to assemble and disassemble, in this embodiment, the electric control board assembly 6 is arranged in the cavity between the first housing 7 and the second housing 8, which is beneficial to the maintenance of the electric control board assembly in the electronic oil pump, and the connection between the first housing 7 and the second housing 8 is reliable, of course, the first housing 7 and the second housing 8 may also be connected by plugging, clamping or other means.

Figure 2:
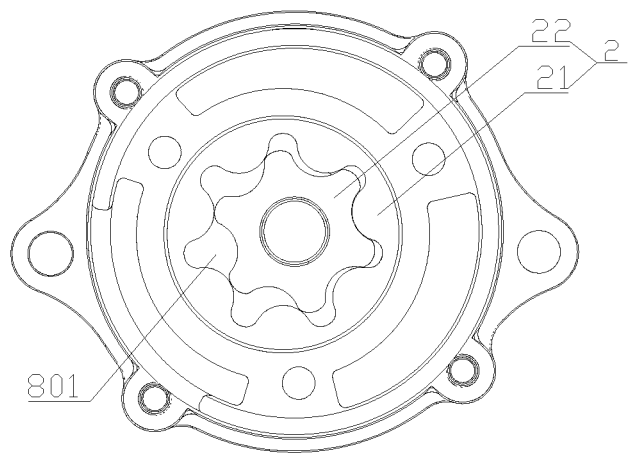
FIG. 2 is a schematic front view of a partial structure of the electronic oil pump in FIG. 1 without a pump cover.

Referring to FIG. 2, the first rotor assembly 2 includes a first rotor 21 and a second rotor 22, the first rotor 21 includes multiple inner teeth, and the second rotor 22 includes multiple outer teeth, a hydraulic cavity 801 is formed between the inner teeth of the first rotor 21 and the outer teeth of the second rotor 22, in this embodiment, the hydraulic cavity 801 is also a part of the first cavity 70, in this embodiment, the first rotor 21 is mounted outside an outer periphery of the second rotor 22. Referring to FIG. 1 again, the electronic oil pump further includes an inlet 11 and an outlet (not shown), the working medium can enter the hydraulic cavity 801 through the inlet 11 and leave the hydraulic cavity 801 through the outlet (not shown); as there is a certain eccentricity between the first rotor 21 and the second rotor 22, when the second rotor 22 rotates, some outer teeth of the second rotor 22 mesh with some inner teeth of the first rotor 21, thus driving the first rotor 21 to rotate; during one revolution of the first rotor 21 and the second rotor 22, an internal volume of the hydraulic cavity 801 changes, specifically, when the first rotor assembly 2 rotates to a certain angle from the initial position, the volume in the hydraulic cavity 801 gradually increases to form a partial vacuum, the working medium is sucked into the hydraulic cavity 801 from the inlet 11, when the first rotor 21 and the second rotor 22 continue to rotate, the volume of the hydraulic cavity 801 filled with the working medium gradually decreases, and the working medium is squeezed, so that the working medium entering the hydraulic cavity 801 is pressed out to the outlet (not shown), thereby generating flowing power; in this embodiment, the electronic oil pump 100 further includes a pump shaft 15, which can drive part of the first rotor assembly 2 to rotate, specifically, in this embodiment, the pump shaft 15 can drive the second rotor 22 to rotate, in this embodiment, the pump shaft 15 connects the second rotor 22 and the second rotor assembly 3, the second rotor assembly 3 drives the second rotor 22 to rotate through the pump shaft 15, thereby realizing the rotation of the first rotor assembly 2.

Referring to FIG. 1, FIG. 1 is a structural diagram of a first embodiment of an electronic oil pump in the present application; the structure of the electronic oil pump according to the first embodiment of the present application is described in detail below.

Referring to FIG. 1, the electronic oil pump 100 further includes a partition member 5, at least part of the partition member 5 is arranged between the stator assembly 4 and the electric control board assembly 6, the second cavity 80 is located at one side of the main body 51 of the partition member 5, and the third cavity 90 is located at the other side of the main body 51 of the partition member 5; Referring to FIG. 1 to FIG. 4, the electronic oil pump 100 further includes a heat conducting member 9, in this embodiment, the heat conducting member 9 is fixedly connected with the main body 51 of the partition member 5, the heat conducting member 9 passes through the main body 51 of the partition member 5 in the vertical direction of the electronic oil pump 100, specifically, in this embodiment, the heat conducting member 9 is used as an insert, and the partition member 5 is formed by injection molding, that is, the heat conducting member 9 and the partition member 5 are fixedly connected by injection molding.

Figure 6:
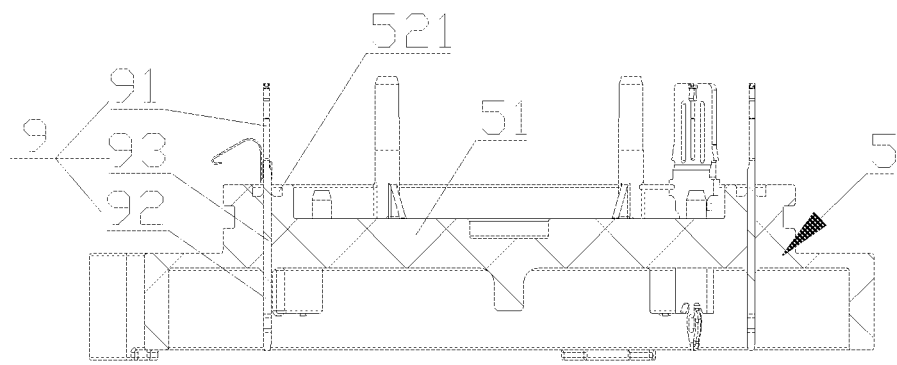
FIG. 6 is a schematic structural diagram of a section taken along the A-A direction in FIG. 5.
Figure 7:
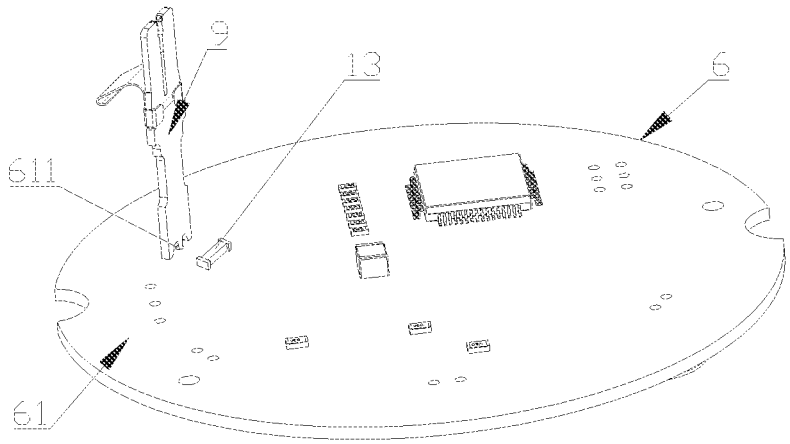
FIG. 7 is a three-dimensional structure diagram of an electric control board assembly and the heat conducting member assembled together in FIG. 1.
Figure 8:
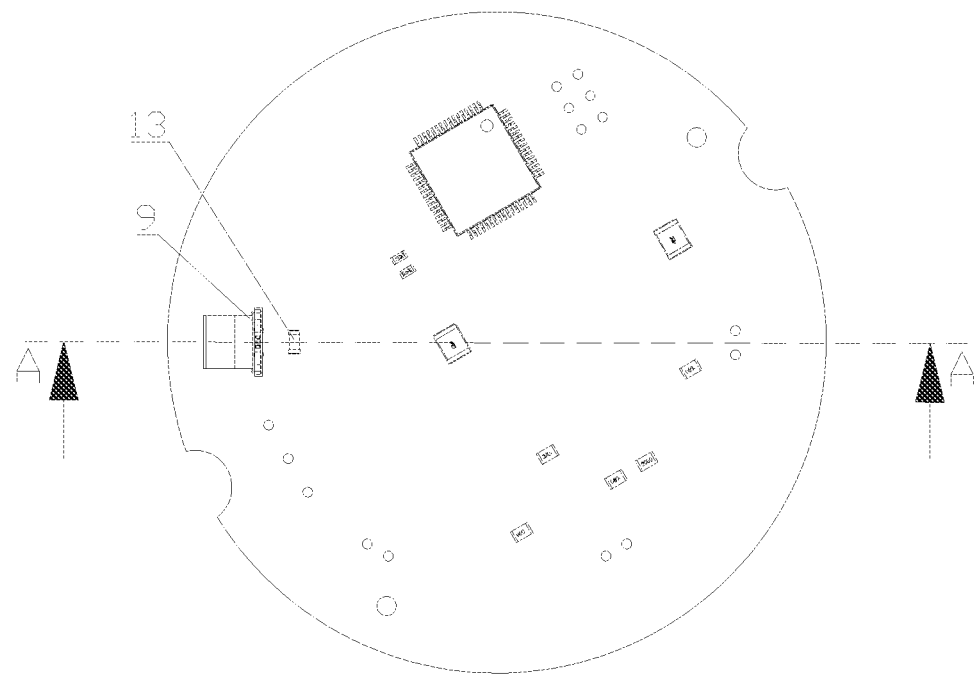
FIG. 8 is a schematic diagram of a front structure of the electric control board assembly and the heat conducting member assembled together.

Referring to FIG. 1 to FIG. 6, the heat conducting member 9 includes a first part 91, a second part 92 and a connecting part 93, the first part 91 is located at one side of the main body 51 of the partition member 5, the second part 92 is located on the other side of the main body 51 of the partition member 5, the first part 91 is located in the second cavity 80, and the second part 92 is located in the third cavity 90, the connecting part 93 is located between the first part 91 and the second part 92, the connecting part 93 connects the first part 91 and the second part 92, the connecting part 93 is fixedly connected with the partition member 5 by injection molding, in this embodiment, the joint between the connecting part 93 and the partition member 5 is sealed; specifically, referring to FIG. 6, the partition member 5 includes a first convex part 52, the first convex part 52 protrudes from the upper surface of the main body 51 of the partition member 5, and the heat conducting member 9 passes through the first convex part 52; the first convex part 52 includes a groove 521, and the groove 521 is recessed from the upper surface of the first convex part 52, the groove 521 does not reach the lower surface of the main body 51 of the partition member 5, the heat conducting member 9 passes through the groove 521, sealant is filled between the outer periphery of part of the heat conducting member 9 and the inner wall of the groove 521, and this part of the heat conducting member is located in the groove 521; the sealant helps to prevent the working medium in the second cavity 80 from leaking to the third cavity 90 through the joint between the connecting part 93 and the partition member 5, so as to facilitate preventing affecting the performance of the electric control board assembly 6 located in the third cavity 90.

Referring to FIG. 7 to FIG. 10, the electric control board assembly 6 includes a substrate 61, the substrate 61 includes a first hole 611, an upper plate layer 612, a lower plate layer 613 and at least one metal layer 614. Along a thickness direction parallel to the substrate 61, the metal layer 614 is located between the upper plate layer 612 and the lower plate layer 613, the upper plate layer 612 is closer to the main body 51 of the partition member 5 than the lower plate layer 613, the first hole 611 is defined in a direction from an upper surface of the upper plate layer 612 to the lower plate layer 613, part of the second part 92 of the heat conducting member 9 is located in the first hole 611; specifically, in this embodiment, the first hole 611 is provided through the substrate, of course, the first hole 611 may also be a blind hole.

Referring to FIG. 1 to FIG. 10, the electric control board assembly 6 further includes a temperature sensing unit 13, the temperature sensing unit 13 is fixedly connected with the substrate 61. Along the height direction perpendicular to the electronic oil pump 100, the temperature sensing unit 13 is located at one side of the second part 92 of the heat conducting member 9, there is a set distance between the temperature sensing unit 13 and the second part 92 of the heat conducting member 9; a metal layer closest to the temperature sensing unit 13 is defined as the nearest metal layer 6141, referring to FIG. 12, FIG. 12 is a projection diagram of temperature sensing unit 13 projected in a direction parallel to the upper surface of the nearest metal layer 6141, this is for illustration only, and the shapes and sizes of the nearest metal layer 6141 and the temperature sensing unit 13 are not limited; referring to FIG. 12, the temperature sensing unit 13 is orthographically projected to a direction parallel to an upper surface of the nearest metal layer 6141, at least part of the projection of the temperature sensing unit 13 is located at the nearest metal layer 6141, the temperature sensing unit 13 can detect the temperature of the nearest metal layer 6141, or the temperature sensing unit 13 can detect the temperature of the upper plate layer 612 in contact with the nearest metal layer 6141; here are two embodiments: the first embodiment: referring to FIG. 10 and FIG. 12, the temperature sensing unit 13 includes a detection part 131 and an electrical connection part 132, the detection part 131 is supported on the upper plate layer 612, one end of the electrical connection part 132 is electrically connected with the detection part 131, and the other end of the electrical connection part 132 is electrically connected with the circuit of the upper plate layer 612; in this embodiment, the electrical connection part 132 is located below the detection part 131, the electrical connection part 132 can be a solder joint or other structures for electrical connection; the second embodiment: referring to FIG. 11 and FIG. 12, the upper plate layer 612 has a through hole 6120, and the temperature sensing unit 13 includes a detection part 131 and an electrical connection part 132, at least part of the detection part 131 is located in the through hole 6120, the detection part 131 is supported on and in contact with the nearest metal layer 6141, one end of the electrical connection part 132 is electrically connected with the detection part 131, and the other end of the electrical connection part 132 is electrically connected with the circuit of the upper plate layer 612; in this embodiment, the electrical connection part 132 is located below the detection part 131, the electrical connection part 132 can be a solder joint or other structures for electrical connection; in this embodiment, the temperature sensing unit 13 may be a thermistor or other temperature sensing element such as a temperature sensor.

In this way, on one hand, the temperature sensing unit 13 is integrated with the electronic oil pump 100, and the temperature sensing unit 13 does not need to be mechanically and electrically connected with the external system separately, so that the mechanical connection and circuit connection of the system can be reduced relatively, and the system structure can be simplified and made compact; on the other hand, since the first part 91 of the heat conducting member 9 is located in the second cavity 80 and contacts with the working medium located in the second cavity 80, the heat of the working medium in the second cavity 80 is transferred to the heat conducting member 9, and part of the second part 92 of the heat conducting member 9 is located in the first hole 611, the heat of the heat conducting member 9 can at least be transferred to the nearest metal layer 6141 through the second part 92 located in the first hole 611, in the first embodiment described above, the heat of the nearest metal layer 6141 may be transferred to the detection part 131 of the temperature sensing unit 13 through the upper plate layer 612, the temperature sensing unit 13 may indirectly obtain the temperature of the working medium in the second cavity 80 by detecting the temperature of the upper plate layer 612, or obtain parameters related to the temperature of the working medium in the second cavity 80; in the second embodiment described above, the heat of the nearest metal layer 6141 is directly transferred to the detection part 131 of the temperature sensing unit 13, the detection part 131 may indirectly obtain the temperature of the working medium in the second cavity 80 by detecting the temperature of the nearest metal layer 6141, or obtain parameters related to the temperature of the working medium in the second cavity 80.

Figure 10:
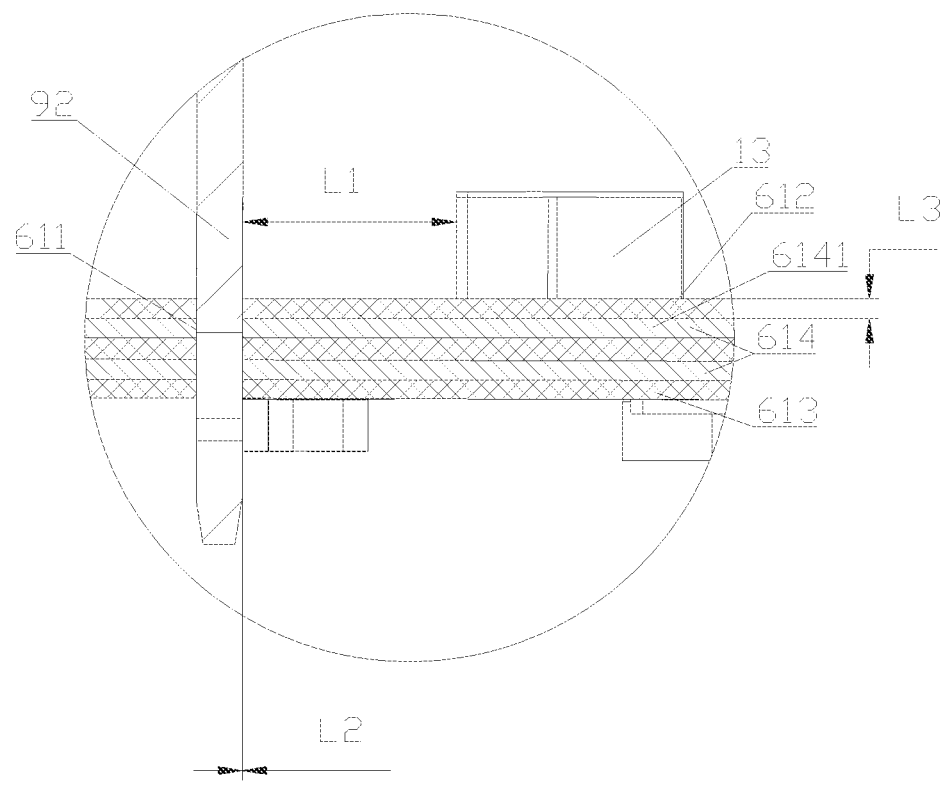
FIG. 10 is an enlarged structural diagram of a first embodiment of part A in FIG. 9.

Referring to FIG. 10, in the first embodiment described above, the minimum gap distance between the temperature sensing unit 13 and the second part 92 of the heat conducting member is defined as a first distance (L1), the minimum distance between the nearest metal layer 6141 and the second part 92 located in the first hole 611 is defined as a second distance (L2), the metal layer closest to the temperature sensing unit 13 is defined as the nearest metal layer 6141, the minimum distance between the nearest metal layer 6141 and the temperature sensing unit 13 is the third distance (L3), the first distance (L1), the second distance (L2) and the third distance (L3) satisfy the following relation: L1>L2+L3; for the heat transferred from the second part 92 of the heat conducting member 9 to the temperature sensing unit 13, the minimum path of heat transfer along the second distance (L2) and the third distance (L3) is smaller than the minimum path of heat transfer along the first distance (L1), therefore, for the heat transferred from the second part 92 of the heat conducting member 9 to the temperature sensing unit 13, the heat transfer speed along the second distance (L2) and the third distance (L3) is greater than the heat transfer speed along the first distance (L1); as air heat transfer may cause heat loss, the above methods are conducive to improving the accuracy of temperature detection by temperature sensing unit 13 compared with air heat transfer.

Specifically, referring to FIG. 10, in this embodiment, at least part of the outer surface of the second part 92 located in the first hole 611 is arranged in contact with the nearest metal layer 6141; in this way, the minimum distance (L2) between the nearest metal layer 6141 and the second part 92 located in the first hole 611 is zero, and the heat of the second part 92 of the heat conducting member 9 can be directly transferred to the nearest metal layer 6141, which is beneficial to reducing the heat loss of the second part 92 of the heat conducting member 9 and improving the accuracy of temperature detection by the temperature sensing unit.

Figure 9:
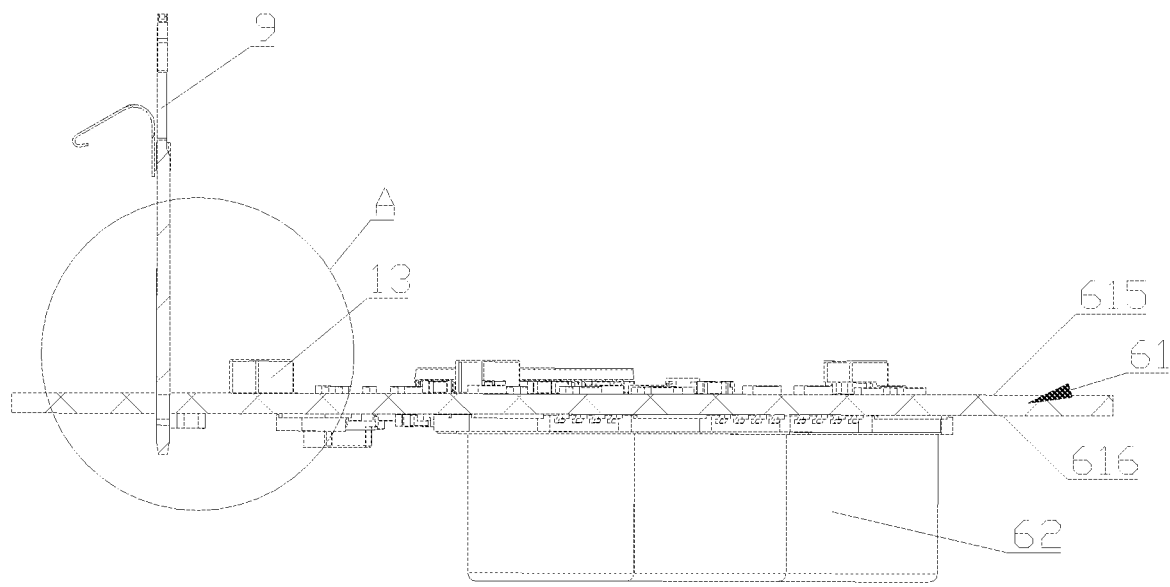
FIG. 9 is a schematic structural diagram of a section taken along the A-A direction in FIG. 8.

Referring to FIG. 9, the electric control board assembly 6 further includes a heat generating electronic component 62, the heat generating electronic component 62 is fixedly connected with the substrate 61, the connection surface of the heat generating electronic component 62 on the substrate 61 and the connection surface of the temperature sensing unit 13 on the substrate 61 are two opposite surfaces; specifically, in this embodiment, the substrate 61 includes a first surface 615 and a second surface 616, the first surface 615 is closer to the main body 51 of the partition member 5 than the second surface 616, in this embodiment, the first surface 615 is the upper surface of the upper plate layer 612, the second surface 616 is the lower surface of the lower plate layer 613, the temperature sensing unit 13 is fixedly connected with the first surface 615, the heat generating electronic component 62 is fixedly connected with the second surface 616, which is beneficial to reducing the influence of the heat generated by the heat generating electronic components 62 on the temperature sensing unit 13, thereby reducing the interference to the temperature sensing unit during detection; the above-mentioned "heat generating electronic components 62" mainly include common heat generating electronic components such as diodes, MOS tubes, inductors, resistors and capacitors.

Figure 3:
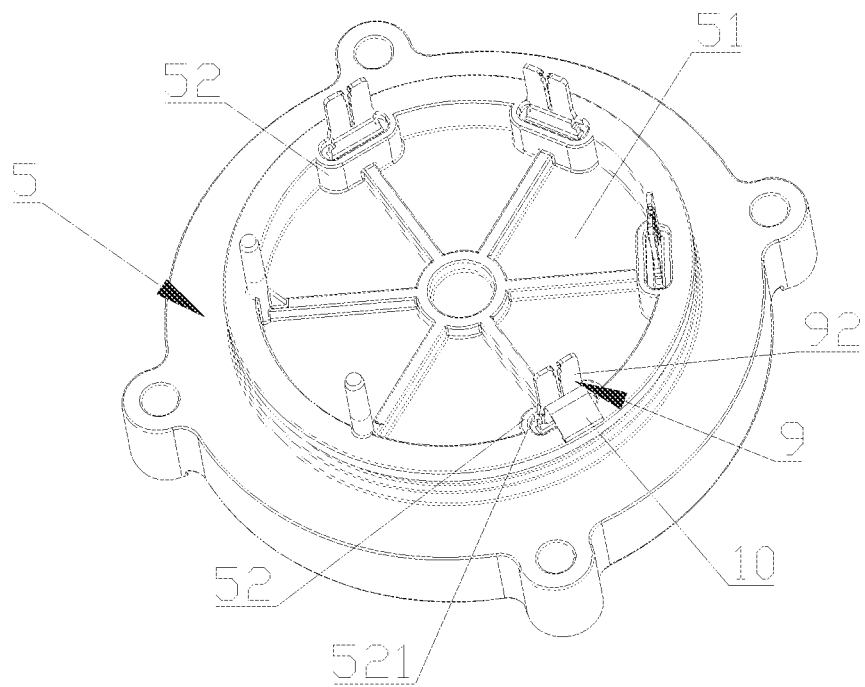
FIG. 3 is a three-dimensional structure diagram of a partition member and a heat conducting member in FIG. 1 assembled together.
Figure 4:
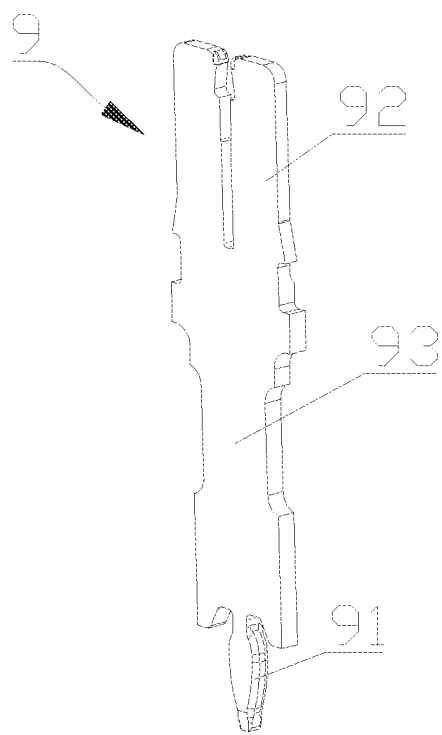
FIG. 4 is a schematic diagram of a three-dimensional structure of the heat conducting member in FIG. 1 or FIG. 3.
Figure 5:
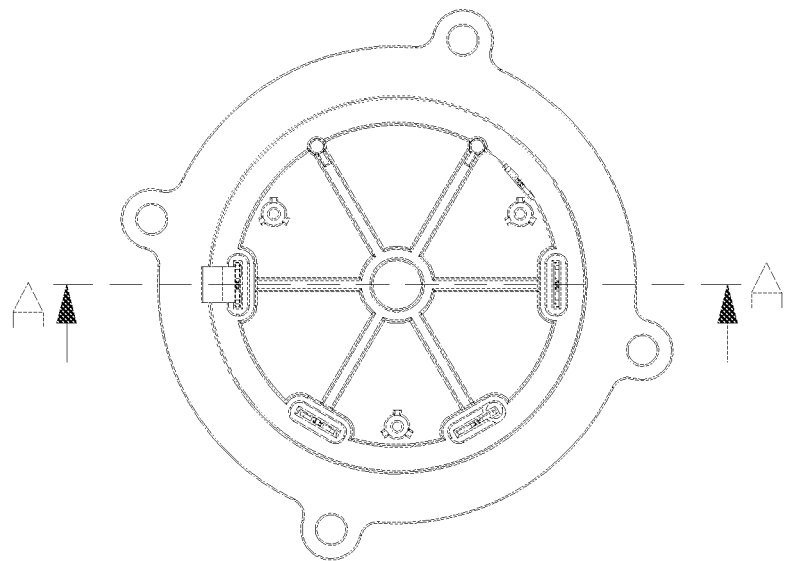
FIG. 5 is a schematic diagram of a front structure of the partition member and the heat conducting member assembled together in FIG. 3.

Referring to FIG. 1 and FIG. 3, in this embodiment, one end of the first part 91 of the heat conducting member 9 is connected with an insulating frame 42 of the stator assembly 4, the first part 91 of the heat conducting member 9 is non-electrically connected with a winding 43 of the stator assembly 4, in this embodiment, the material of the heat conducting member 9 is a conductive metal material, and one end of the second part 92 of the heat conducting member 9 is electrically connected with the electric control board assembly 6; specifically, in this embodiment, one end of the second part 92 of the heat conducting member 9 is electrically connected with a reference ground plane of the electric control board assembly 6; referring to FIG. 1, the electronic oil pump 100 further includes a conductive member 10, the conductive member 10 is located in the second cavity 80, and the conductive member 10 is fixedly connected and contacted with the second part 92 of the heat conducting member 9, in this embodiment, the conductive member 10 and the heat conducting member 9 are separately processed and then assembled, of course, the conductive member 10 and the heat conducting member 9 may also be an integral structure; referring to FIG. 1, at least part of the conductive member 10 is located in the inner cavity of the first housing 7, the material of the first housing 7 is metal, and the first housing 7 partially surrounds the periphery of the stator assembly 4; the stator assembly 4 is located in the inner cavity of the first housing 7, and when the winding 43 of the stator assembly 4 radiates electromagnetic waves outward or when an external system radiates electromagnetic waves to the first housing, the electromagnetic wave radiated by the winding 43 is absorbed by the first housing 7 itself, which is beneficial to preventing the electromagnetic wave radiated by the winding from affecting the external system or the electromagnetic wave of the external system from affecting the performance of the electronic oil pump; referring to FIG. 1 and FIG. 3, part of the conductive member 10 is in contact with the first housing 7, and the another part of the conductive member 10 is in contact with the heat conducting member 9; with the above method, as one end of the second part 92 of the heat conducting member 9 is electrically connected with a reference ground plane of the electric control board assembly 6, part of the conductive member 10 is in contact with the first housing 7, and the another part of the conductive member 10 is in contact with the heat conducting member 9, the first housing 7 is indirectly electrically connected with the reference ground plane of the electric control board assembly 6, while the reference ground plane of the electric control board assembly 6 is externally grounded, therefore, on one hand, the first housing 7 can radiate the electromagnetic wave absorbed by itself to the reference ground plane of the electric control board assembly 6, when the reference ground plane of the electric control board assembly 6 is grounded to the outside, the electromagnetic waves absorbed by the reference ground plane of the electric control board assembly 6 radiate to the outside grounding point, which is conducive to reducing the amount of electromagnetic wave absorbed and accumulated by the first housing 7 itself, and is beneficial to reduce the influence of the above electromagnetic wave on the performance of the external system or the electronic oil pump; on the other hand, when the surface of the first housing 7 has static electricity, the static electricity can be transmitted to the reference ground plane of the electric control board assembly 6 through the conductive member 10; when the reference ground plane of the electric control board assembly 6 is grounded to the outside, the static electricity on the reference ground plane is conducted to the outside grounding point, which is conducive to reducing the static electricity accumulated on the surface of the first housing 7, and thus to reducing the impact of the above static electricity on the performance of the external system and/or the electric control board assembly 6; besides, in this embodiment, the stator core 41, the second housing 8 and the pump cover 1 are all in contact with the first housing 7, so that the stator core 41 and the second housing 8 are electrically connected with the reference ground plane of the electric control board assembly, the static electricity on the surface of the stator core 41, the second housing 8 and the pump cover 1 or the electromagnetic wave absorbed by the first housing itself can be conducted to the reference ground plane of the electric control board assembly 6, the above static electricity or electromagnetic wave is conducted to the outside grounding point. Referring to FIG. 1, in this embodiment, static electricity is conducted by one end of the conductive member 10 contacting the first housing 7, but of course, one end of the conductive member 10 may also contact the stator core 41 or the second housing 8.

Figure 11:
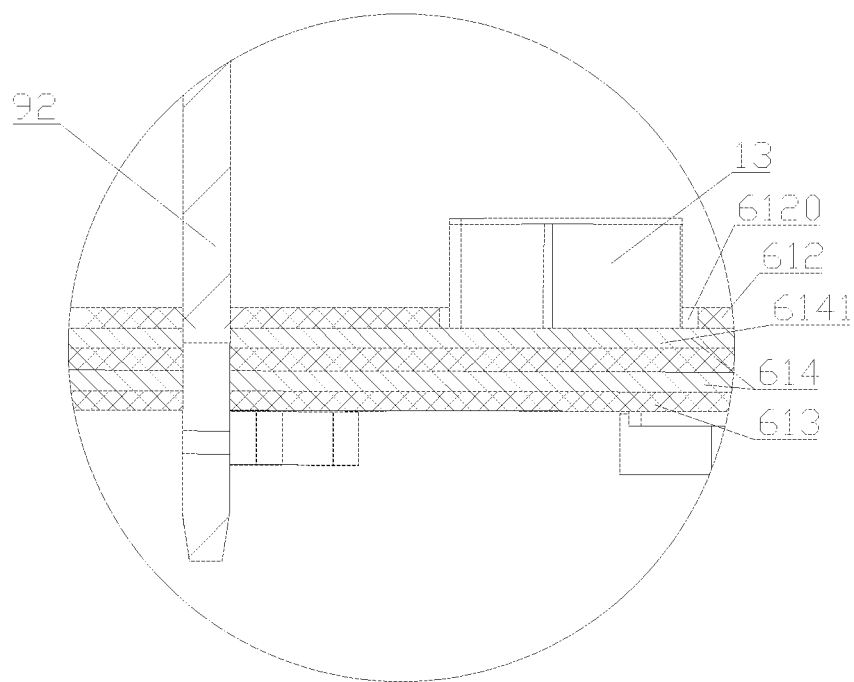
FIG. 11 is an enlarged structural diagram of a second embodiment of part A in FIG. 9.
Figure 12:
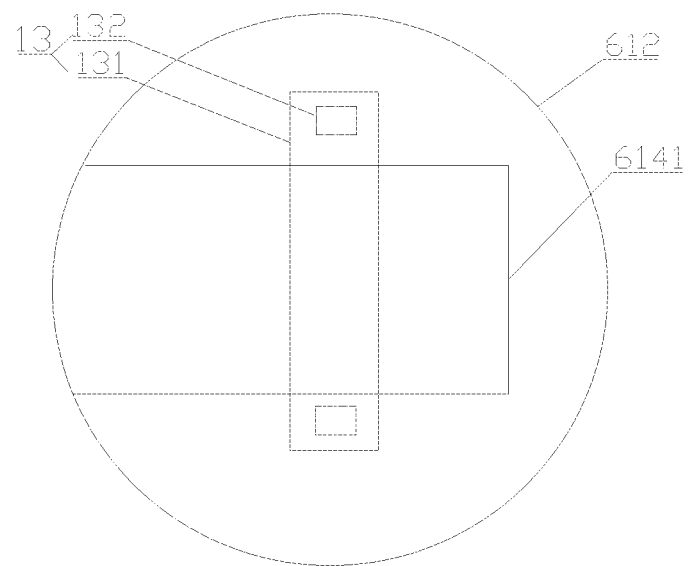
FIG. 12 is a schematic projection diagram of a front projection of a temperature sensing unit in FIG. 10 or FIG. 11 in a direction parallel to the surface of the nearest metal layer.

Referring to FIG. 1, in this embodiment, the heat conducting member 9 is non-electrically connected with a winding 43 of the stator assembly 4, the current passing through the winding 43 may not pass through the heat conducting member 9, which is beneficial to reducing the heat generated by the winding 43 conducted to the heat conducting member 9; as the heat conducting member 9 needs to transfer heat to the nearest metal layer 6141 in FIG. 11, the non-electrical connection between the heat conducting member and the winding helps to prevent the heat generated by the winding 43 from being transmitted to the nearest metal layer 6141 in FIG. 11 through the heat conducting member 9, thus helping to reduce the interference to the temperature sensing unit 13; of course, the first part 91 of the heat conducting member 9 and the winding 43 may also be electrically connected, the heat conductive member 9 can be used as an energizing pin terminal of the winding 43, that is, the heat conductive member 9 may have a current passing through the winding 43, since the first part 91 of the heat conducting member 9 is located in the second cavity 80, the working medium in the second cavity 80 may play a certain role in cooling the heat conducting member 9; therefore, when the current passing through the winding 43 passes through the heat conducting member 9, the current may not cause a large deviation to the detection result of the temperature sensing unit 13. Therefore, in this embodiment, the heat conducting member 9 can be used for conducting heat on one hand, and can be used for electrical connection on the other hand; in this way, the structure of the electronic oil pump is simple, which is conducive to reducing the number of parts, thus saving the cost.

Figure 13:
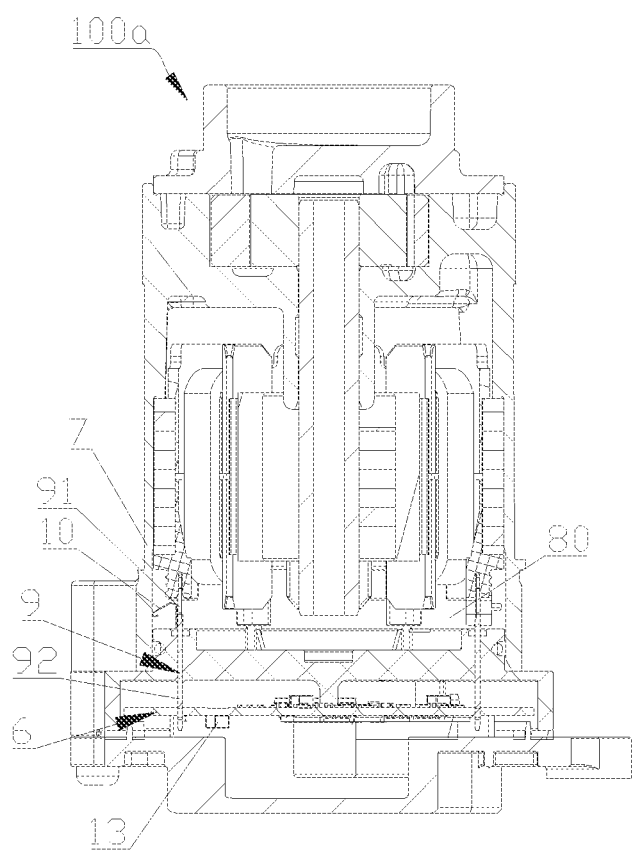
FIG. 13 is a schematic cross-sectional structural view of a second embodiment of the electronic oil pump provided according to the present application.

Referring to FIG. 13, FIG. 13 is a structural diagram of a second embodiment of an electronic oil pump in the present application; the second embodiment of the electronic oil pump in this application is described in detail below.

Figure 14:
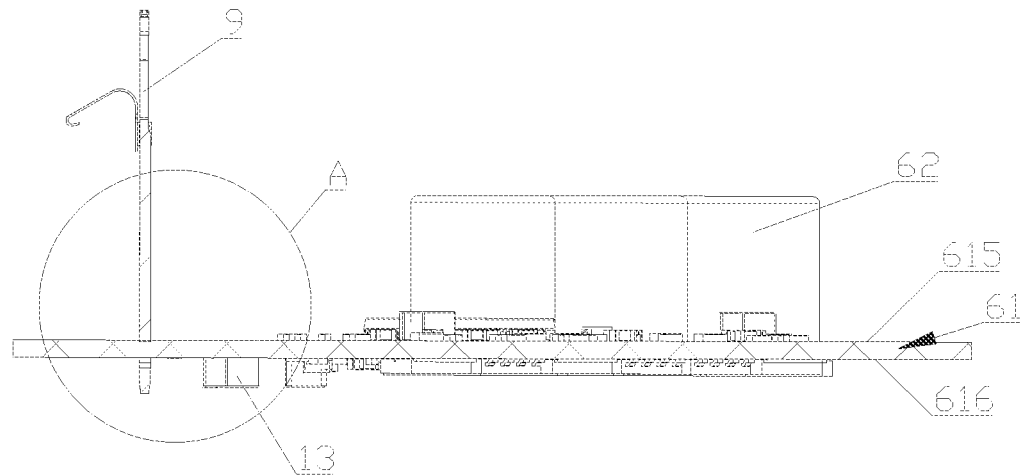
FIG. 14 is a schematic cross-sectional structural view of the electric control board assembly and the heat conducting member assembled together in FIG. 1.
Figure 15:
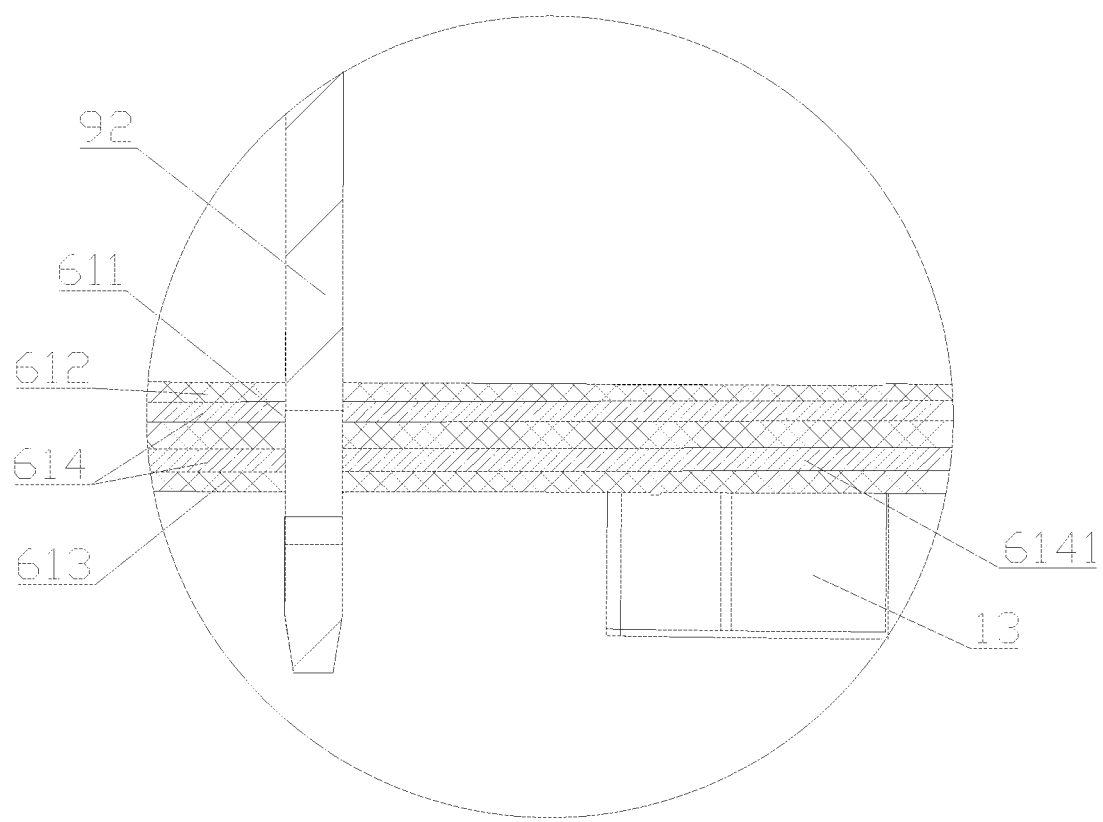
FIG. 15 is an enlarged structural diagram of a first embodiment of part A in FIG. 14.
Figure 16:
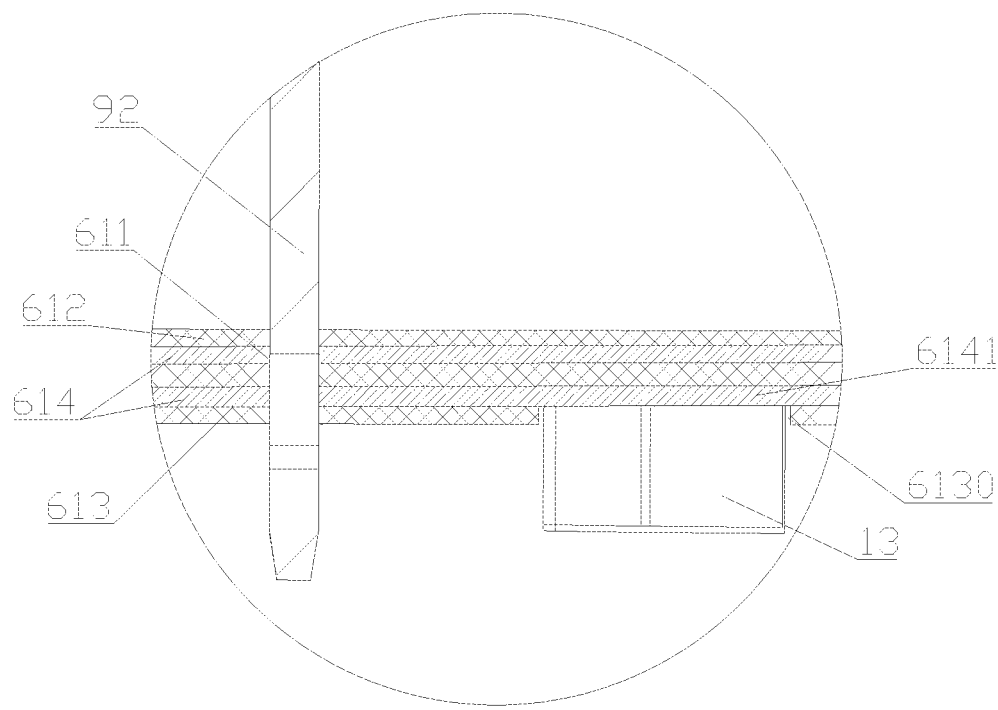
FIG. 16 is an enlarged structural diagram of a second embodiment of part A in FIG. 14.
Figure 17:
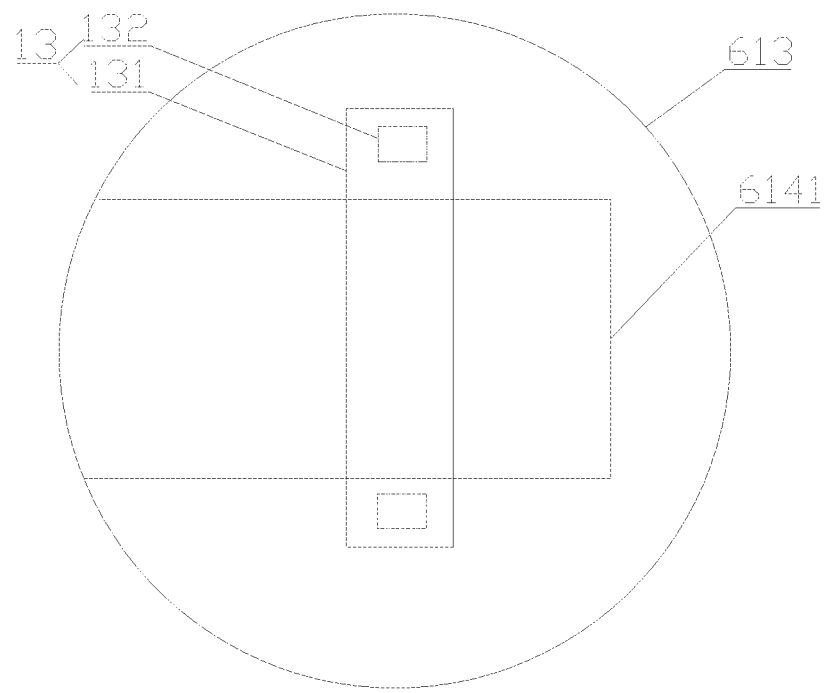
FIG. 17 is a schematic diagram of a front projection of the temperature sensing unit in FIG. 15 or FIG. 16 in the direction parallel to the surface of the nearest metal layer.

Referring to FIG. 13 to FIG. 16, in this embodiment, the temperature sensing unit 13 is fixedly connected with the substrate 61; specifically, in this embodiment, the temperature sensing unit 13 is disposed closer to the lower surface of the substrate 61 than the upper surface of the substrate 61, the temperature sensing unit 13 is orthographically projected to a direction parallel to an upper surface of the nearest metal layer 6141, at least part of the projection of the temperature sensing unit 13 is located at the nearest metal layer 6141, the temperature sensing unit 13 can detect the temperature of the nearest metal layer 6141, or the temperature sensing unit 13 can detect the temperature of the lower plate layer 613 in contact with the nearest metal layer 6141; here are two embodiments: the first embodiment: referring to FIG. 15 and FIG. 17, the temperature sensing unit 13 includes a detection part 131 and an electrical connection part 132, the detection part 131 is supported on the lower plate layer 613, one end of the electrical connection part 132 is electrically connected with the detection part 131, and the other end of the electrical connection part 132 is electrically connected with the circuit of the lower plate layer 613; in this embodiment, the electrical connection part 132 is located below the detection part 131, the electrical connection part 132 can be a solder joint or other structures for electrical connection; the second embodiment: referring to FIG. 16 and FIG. 17, the lower plate layer 613 has a through hole 6130, and the temperature sensing unit 13 includes a detection part 131 and an electrical connection part 132, at least part of the detection part 131 is located in the through hole 6130 of the lower plate layer 613, the detection part 131 is supported on and in contact with the nearest metal layer 6141, one end of the electrical connection part 132 is electrically connected with the detection part 131, and the other end of the electrical connection part 132 is electrically connected with the circuit of the lower plate layer 613; in this embodiment, the electrical connection part 132 is located below the detection part 131, the electrical connection part 132 can be a solder joint or other structures for electrical connection.

In this way, on one hand, the temperature sensing unit 13 is integrated with the electronic oil pump 100, and the temperature sensing unit 13 does not need to be mechanically and electrically connected with the external system separately, so that the mechanical connection and circuit connection of the system can be reduced relatively, and the system structure can be simplified and made more compact; on the other hand, in the first embodiment described above, the heat of the nearest metal layer 6141 may be transferred to the detection part 131 of the temperature sensing unit 13 through the lower plate layer 613, the temperature sensing unit 13 may indirectly obtain the temperature of the working medium in the second cavity 80 by detecting the temperature of the lower plate layer 613, or obtain parameters related to the temperature of the working medium in the second cavity 80; in the second embodiment described above, the heat of the nearest metal layer 6141 is directly transferred to the detection part 131 of the temperature sensing unit 13, the detection part 131 may indirectly obtain the temperature of the working medium in the second cavity 80 by detecting the temperature of the nearest metal layer 6141, or obtain parameters related to the temperature of the working medium in the second cavity 80.

Referring to FIG. 14, the electric control board assembly 6 further includes a heat generating electronic component 62, the heat generating electronic component 62 is fixedly connected with the substrate 61, the connection surface of the heat generating electronic component 62 on the substrate 61 and the connection surface of the temperature sensing unit 13 on the substrate 61 are two opposite surfaces; specifically, in this embodiment, the substrate 61 includes a first surface 615 and a second surface 616, the first surface 615 is closer to the main body 51 of the partition member 5 than the second surface 616, in this embodiment, the first surface 615 is the upper surface of the upper plate layer 612, the second surface 616 is the lower surface of the lower plate layer 613, the temperature sensing unit 13 is fixedly connected with the second surface 616, the heat generating electronic component 62 is fixedly connected with the first surface 615, which is beneficial to reducing the influence of the heat generated by the heat generating electronic components 62 on the temperature sensing unit 13, thereby reducing the interference to the temperature sensing unit 13 during detection; the above-mentioned "heat generating electronic components 62" mainly include common heat generating electronic components such as diodes, MOS tubes, inductors, resistors and capacitors.

Compared with the first embodiment of the electronic oil pump, in this embodiment, the temperature sensing unit 13 is disposed closer to the lower surface of the substrate 61 than the upper surface of the substrate 61, the temperature sensing unit 13 can detect the temperature of the nearest metal layer 6141, or the temperature sensing unit 13 can detect the temperature of the lower plate layer 612 in contact with the nearest metal layer 6141; other features in this embodiment can refer to the first embodiment of the electronic oil pump, which is not be described here.

Figure 18:
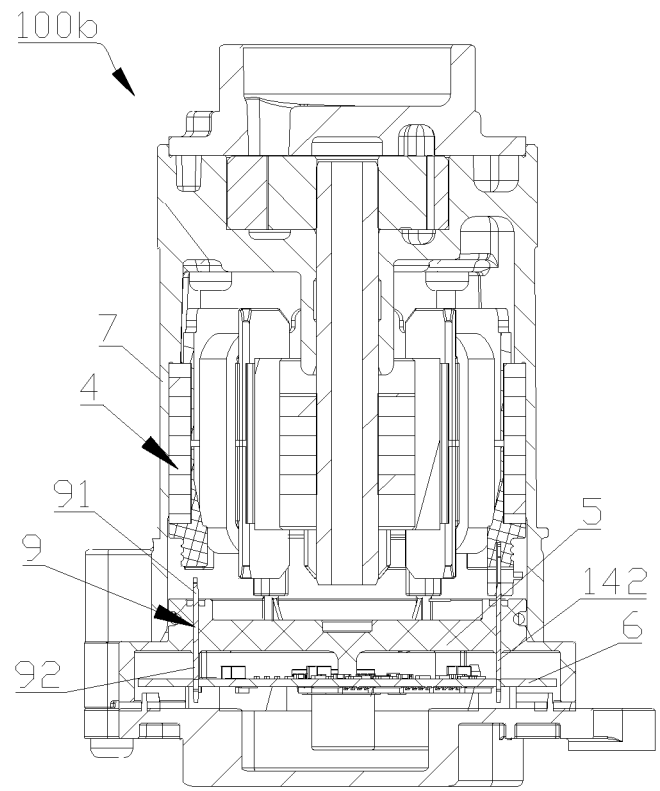
FIG. 18 is a schematic cross-sectional structural view of a third embodiment of an electronic oil pump provided according to the present application.

Referring to FIG. 18, FIG. 18 is a structural diagram of a third embodiment of an electronic oil pump in the present application; the third embodiment of the electronic oil pump in this application is described in detail below.

Figure 19:
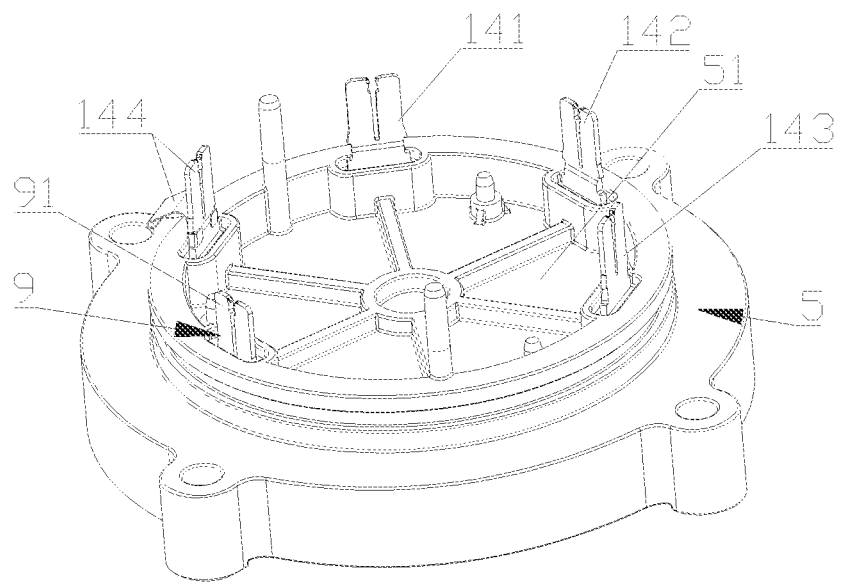
FIG. 19 is a three-dimensional structure diagram of the partition member and the heat conducting member assembled together in FIG. 18.

Referring to FIG. 18 and FIG. 19, in this embodiment, one end of the first part 91 of the heat conducting member 9 is a free end, one end of the first part 91 is not in contact with the stator assembly 4, and one end of the second part 92 is connected with the electric control board assembly 6; in this embodiment, the electronic oil pump 100 further includes four connection terminals, the connection terminal penetrates the upper and lower surfaces of the main body 51 of the partition member 5 and is fixedly connected with the main body 51 of the partition member 5, specifically, the four connection terminals are defined as the first connection terminal 141, the second connection terminal 142, the third connection terminal 143 and the fourth connection terminal 144, the first connection terminal 141, the second connection terminal 142, and the third connection terminal 143 serve as the energizing pin terminals of the winding 43, specifically, one end of each of the first connection terminal 141, the second connection terminal 142 and the third connection terminal 143 is electrically connected to the winding 43 of the stator assembly 4, another end of each of the first connection terminal 141, the second connection terminal 142 and the third connection terminal 143 is electrically connected to the electric control board assembly 6, the fourth connection terminal 144 electrically connects the reference ground plane of the electric control board assembly 6 and the first housing 7.

Compared with the first embodiment of the electronic oil pump, in this embodiment, the electronic oil further includes a connection terminal, one end of the first part 91 of the heat conducting member 9 is a free end, one end of the first part 91 is not in contact with the stator assembly 4, and one end of the second part 92 is non-electrically connected with the electric control board assembly 6; the heat conducting member 9 only has the function of conducting heat, but does not have the function of electrical connection; other features in this embodiment can refer to the first embodiment of the electronic oil pump, which is not be described here; besides, in this embodiment, the temperature sensing unit 13 is located closer to the upper surface of the substrate 61 than the lower surface of the substrate 61. For the specific structure, please refer to the temperature sensing unit in the first embodiment of the electronic oil pump; of course, the temperature sensing unit 13 may be disposed close to the lower surface of the substrate 61, for details, refer to the temperature sensing unit in the second embodiment of the electronic oil pump, which is not repeated here.

The above embodiments are only used to illustrate the present application rather than limit the technical solutions described in the present application. Although the present application is described in detail in this specification with reference to the above embodiments, those of ordinary skill in the art should understand that those skilled in the art may still modify or equivalently replace the present application, and all technical solutions and improvements thereof that do not depart from the spirit and scope of the present application shall be covered within the scope of the claims of the present application.

What is claimed is:

1. An electronic oil pump, comprising a first rotor assembly, a stator assembly and an electric control board assembly, wherein the electronic oil pump has a first cavity, a second cavity and a third cavity, the first rotor assembly is located in the first cavity, the stator assembly is arranged in the second cavity, the electric control board assembly is arranged in the third cavity, the first cavity is communicated with the second cavity, and the second cavity is not communicated with the third cavity; the electronic oil pump further comprises a partition member, at least part of the partition member is arranged between the stator assembly and the electric control board assembly, the second cavity is located at one side of a main body of the partition member, the third cavity is located at the other side of the main body of the partition member; wherein the electronic oil pump further comprises a heat conducting member, the heat conducting member comprises a first part and a second part, the first part is located in the second cavity, the second part is located in the third cavity; wherein the electric control board assembly comprises a substrate, the substrate comprises a first hole, an upper plate layer, a lower plate layer and at least one metal layer, the metal layer is located between the upper plate layer and the lower plate layer, the upper plate layer is closer to the main body of the partition member than the lower plate layer, the first hole is defined in a direction from an upper surface of the upper plate layer to the lower plate layer, part of the second part is located in the first hole; wherein the electric control board assembly further comprises a temperature sensing unit, the temperature sensing unit is connected with the substrate, along a height direction perpendicular to the electronic oil pump, the temperature sensing unit is located at one side of the second part, there is a preset distance between the temperature sensing unit and the second part; wherein a metal layer closest to the temperature sensing unit is defined as a nearest metal layer, the temperature sensing unit is orthographically projected to a direction parallel to an upper surface of the nearest metal layer, at least part of the projection of the temperature sensing unit is located at the nearest metal layer, the temperature sensing unit can detect the temperature of the nearest metal layer, or the temperature sensing unit can detect the temperature of the upper plate layer contacting with the nearest metal layer or the temperature of the lower plate layer contacting with the nearest metal layer.

2. The electronic oil pump according to claim 1, wherein a minimum gap distance between the temperature sensing unit and the second part is defined as a first distance (L1), a minimum distance between the nearest metal layer and the second part in the first hole is defined as a second distance (L2), a minimum distance between the nearest metal layer and the temperature sensing unit is defined as a third distance (L3), the first distance (L1), the second distance (L2) and the third distance (L3) satisfy the following relation: L1>L2+L3.

3. The electronic oil pump according to claim 1, wherein the temperature sensing unit comprises a detection part and an electrical connection part, the detection part is supported on the upper plate layer or the lower plate layer; when the detection part is supported on the upper plate layer, the electrical connection part is electrically connected with a circuit of the upper plate layer; when the detection part is supported on the lower plate layer, the electrical connection part is electrically connected with a circuit of the lower plate layer.

4. The electronic oil pump according to claim 1, wherein the upper plate layer or the lower plate layer is provided with a through hole, and the temperature sensing unit comprises a detection part and an electrical connection part, at least part of the detection part is located in the through hole, the detection part is supported on the nearest metal layer and contacted with the nearest metal layer, the electrical connection part is electrically connected with the circuit of the upper plate layer or the lower plate layer with the through hole.

5. The electronic oil pump according to claim 1, wherein at least part of an outer surface of the second part located in the first hole is arranged in contact with the nearest metal layer; wherein one end of the first part is a free end, and one end of the first part is not in contact with the stator assembly, one end of the second part is in non-electrically connected with the electric control board assembly.

6. The electronic oil pump according to claim 1, wherein at least part of an outer surface of the second part located in the first hole is arranged in contact with the nearest metal layer; one end of the first part is connected with the stator assembly, and one end of the second part is electrically connected with the electric control board assembly.

7. The electronic oil pump according to claim 6, wherein the stator assembly comprises a stator core, a winding and an insulating frame, at least part of the insulating frame covers a surface of the stator core, and the winding is wound around the insulating frame, one end of the first part is connected with the insulating frame, and the first part is electrically connected with the winding, the heat conducting member can be used as an energizing pin terminal of the winding.

8. The electronic oil pump according to claim 6, wherein the heat conducting member is electrically connected with the reference ground plane of the electric control board assembly; the stator assembly comprises a stator core, a winding and an insulating frame, at least part of the insulating frame covers a surface of the stator core, and the winding is wound around the insulating frame, one end of the first part is connected with the insulating frame, and the first part is non-electrically connected with the winding.

9. The electronic oil pump according to claim 8, wherein a material of the heat conducting member is a material capable of conducting electricity; the electronic oil pump further comprises a conductive member, the conductive member is located in the second cavity, and the conductive member is in contact with the second part; the electronic oil pump comprises a first housing, at least part of the conductive member is located in an inner cavity of the first housing, a material of the first housing is a conductive material, and the conductive member is arranged in contact with the first housing or the stator core.

10. The electronic oil pump according to claim 4, wherein the electric control board assembly further comprises a heat generating electronic component, the heat generating electronic component is connected with the substrate, the connecting surface of the heat generating electronic component on the substrate is opposite to the connecting surface of the temperature sensing unit on the substrate.

11. The electronic oil pump according to claim 1, wherein along a height direction of the electronic oil pump, the heat conducting member passes through the main body of the partition member; the heat conducting member comprises a connecting part, the connecting part is located between the first part and the second part, wherein the connecting part is fixedly connected with the partition member, and the joint between the connecting part and the partition member is sealed.

* * * * *